Patented June 14, 1938

2,120,602

UNITED STATES PATENT OFFICE 2,120,602

PROCESS OF MAKING TITANIUM AND OTHER COMPOUNDS

Kenneth Hume Donaldson, Cleveland, Ohio

No Drawing. Application August 30, 1935, Serial No. 38,534

11 Claims. (Cl. 23—16)

This invention relates to a process of making oxides of a certain group of metals and has particular reference to a process of preparing titanium oxide and/or zirconium oxide in substantially pure form.

In prior methods of treating titanium ores such as rutile, ilmenite, etc. and other titaniferous material with varying proportions of associated iron compounds, the titanium bearing material is subjected to the action of strong sulphuric acid whereby $FeSO_4$ is formed from the iron present in the compounds. This $FeSO_4$ possesses practically no commercial value and, furthermore, it has been found difficult to remove the $FeSO_4$ from the precipitated titanium compound to a sufficient extent so that it will not discolor the final product, which is $TiO_2$.

In another of these prior processes, a mixture of titanium bearing material together with carbon or other reducing agent is subjected to the action of chlorine, whereby both $FeCl_3$ and $TiCl_4$ are formed, but it has been found difficult to effect a clean separation between these chlorides, and the production of $TiO_2$ having the desirable pigment properties is rather trying due to the difficulty of controlling the hydrolysis of $TiCl_4$ in aqueous solutions.

In another of these prior processes, a heated mixture of ilmenite, or other titanium bearing substance, with carbon and chlorine is treated under temperature control so that the $FeCl_3$ will volatilize but the $TiCl_4$ will not pass off. This process also possesses the difficulties involved if $TiO_2$ possessing the desirable pigment properties is to be produced from the $TiCl_4$. Also, from a commercial standpoint, production of $TiO_2$ from $TiCl_4$, starting with ilmenite or other titanium bearing materials, has been proved to be unfeasible, because it is commercially impracticable to recover the chlorine as hydrochloric acid, in view of the very dilute condition in which the hydrochloric acid is formed.

Among the objects of this invention is to provide a process for the treatment of ores and other materials whereby selective reduction of some of the constituents of the treated mass is effected while the reduction of the rest of the mass is prevented, then forming a volatile halogen compound of the reduced mass while preventing the halogenation of the unreduced mass.

More specifically, it is an object of this invention to treat ilmenite, rutile or other titanium bearing materials with carbon or suitable compounds of carbon, at the proper temperature whereby the iron present in the material will be reduced to the metallic state but the titanium compounds will not be thus reduced.

A further object of this invention is to treat the mass containing the metallic iron and the unreduced material with chlorine or certain other suitable gaseous compounds that will form $FeCl_3$ with the metallic iron and controlling the temperature so that the titanium compounds present in the mass will not be converted into $TiCl_4$, the process however being carried out at a sufficient temperature to volatilize the $FeCl_3$ formed by the reaction.

A further object of this invention is to recover $TiO_2$ in a condition of high degree of purity and substantially free from discoloration by the material remaining after the $FeCl_3$ has been evolved.

A still further object of this invention is to provide processes for making $TiO_2$ and $ZrO_2$ which will avoid the disadvantages incident to the prior processes.

Other, further and more specific objects of this invention will become readily apparent to persons skilled in the art from a consideration of the following description wherein certain specific embodiments of my invention are set forth.

When compounds, or solid solutions, of titanium oxide and iron oxide are heated in the presence of carbon, or certain other reducing reagents such as coal, coke, oil, tar, hydrocarbons, etc., the iron oxide will be reduced first and at a lower temperature than the titanium oxide. The reactions which may vary according to the temperature of the material being treated, are illustrated by the following equations:

$$FeOTiO_2 + C = Fe + CO + TiO_2 \quad (1)$$
$$FeOTiO_2 + CO = Fe + CO_2 + TiO_2 \quad (2)$$

Reaction (2) is reversible as to the Fe and $CO_2$ and, if too much $CO_2$ is present, a secondary reaction takes place as follows:

$$Fe + CO_2 = FeO + CO \quad (3)$$

The percentage of $CO_2$ which may be present varies with the temperature of the process. For effective operation, care should be taken that the Fe is not reoxidized by the admission of excess air after it is reduced.

In preparing $TiO_2$, a titaniferous material, such as rutile, ilmenite, etc. is mixed in finely ground condition with finely ground carbon in substantially stoichiometric relation to the iron present in the titaniferous material, and the mass is heated at a temperature sufficiently high to reduce the iron compounds to metallic iron. A temperature of about 900° C. has been found satisfactory. However, this temperature should be kept below 1000° C. in order to prevent reduction of the titanium compounds present in the mass. The reduction with carbon is conducted in a controlled atmosphere, with or without admitting air, the admission of air if desired being regulated so as to maintain proper equilibrium between Fe, FeO, C, CO and $CO_2$. The most suitable equilibrium for accomplishing the desired reduction of FeO to Fe is believed to be when there are four parts of CO present for each part of $CO_2$. After the iron compounds have been reduced, any slight excess of carbon is removed and the residue is subjected to a chloridizing treatment at an elevated temperature above 350° C. and below 1000° C., by passing chlorine gas, or a gas containing chlorine such as hydrochloric acid over or through this residue, whereby $FeCl_3$ is produced from the iron, and if the temperature of the mass be sufficiently high the $FeCl_3$ will volatilize and may be condensed and recovered by suitable apparatus. The titanium compounds do not volatilize during this treatment, and after removal of $FeCl_3$, the residue will contain a high percentage of $TiO_2$ and a relatively small amount of iron and other impurities and will be of such a character as to serve well as the material to be used in the following steps for the commercial production of paint pigments. The amount of iron left with the titanium depends on how near to completion the reaction is carried, but for the subsequent step of my process I prefer to remove the iron down to 3 or 4% of the residue.

The residue made as above described, containing 3 to 4% iron, may be further purified by mixing with $NH_4F$ and/or $HF.NH_4F$ and heated for about an hour, to convert the $TiO_2$ to one or more water soluble complex salts containing titanium and fluorine, which may or may not be acidulated. The time of heating varies with the fineness and thoroughness of the mixture. This reaction should be carried on at a temperature below that at which the complex salts volatilize. I have found that a temperature of 300 to 350° C. is satisfactory to retain all of the titanium compounds in the solid form at this point in the operation.

After the treatment with $NH_4F$ and/or $HF.NH_4F$, the reaction product is placed in water which dissolves the complex titanium salt. Ammonium sulphide is then added to the aqueous solution of the titanium salt to precipitate any residual iron compounds which may have been carried along in the process. The precipitated FeS is then removed from the solution, by filtering or other suitable means, and the clear solution of the titanium salt is treated with $NH_4OH$ to precipitate the titanium as the hydroxide. The titanium hydroxide is separated by filtration or any other suitable manner and then calcined, to obtain $TiO_2$ of good color, high tinting strength and other valuable pigment properties.

The $NH_4F$, produced in the above reaction between the complex titanium salt and the $NH_4OH$, can be recovered and used over again.

My process possesses the following distinct advantages.

1. By proportioning the carbon employed in the reduction of the iron oxide so that it is in substantially stoichiometric relation thereto, I avoid excessive consumption of carbon. Furthermore, since there is practically no carbonaceous material present during the chloridization step in my process, I avoid the tendency toward side reactions involving combination between carbon and chlorine and causing loss of chlorine.

2. The reduction and chloridization are accomplished in two steps, which admit of the formation of $FeCl_3$ without the simultaneous formation of any large amount of $TiCl_4$. The bulk of the titanium remains in the residue as $TiO_2$.

3. By reducing and chloridizing in two steps, it is feasible to effect separation of the iron and titanium without close temperature control, because the chloridization of the iron can be accomplished through a wider range of temperature, when there is substantially no carbon present, without an accompanying reaction of the chloridizing agent upon titanium compounds to form $TiCl_4$. Temperature control in a process of this kind presents many difficulties in commercial operation and by dispensing with the need for close temperature control a decided advantage is derived.

4. By effecting reduction and chloridization in two steps, and the chloridization step being carried on in the absence of carbon, it is possible to conduct the chloridizing operation at a higher temperature than when reduction and chloridization are carried out in one step. I am therefore able by my process to reduce the time of chloridizing and to produce a residue of titanium oxide fairly low in iron. Furthermore, the chloridizing agent is also more efficiently employed.

5. By removing a large part of the iron as $FeCl_3$, it is commercially feasible to form the complex salt containing titanium and fluorine in the treatment with $NH_4F$ and/or $HF.NH_4F$ through an intermediate step in the formation of $TiO_2$. If large amounts of iron are associated with the titanium bearing material the difficulty of separating the iron from the titanium is so great when carried out by the prior processes that the latter step of forming the complex salt containing titanium and fluorine is of doubtful commercial value.

6. In my process, a large part of the iron is recovered as $FeCl_3$ which has considerable commercial value. Also, the separation of the iron from the titanium as volatile $FeCl_3$ eliminates the costly washing steps heretofore employed in the removal of the iron.

7. In my process, the formation of $TiCl_4$ is prevented, thus overcoming the difficulties caused by the presence of the $TiCl_4$ which is not stable in a water solution and does not respond readily to treatment for the recovery of $TiO_2$ in a form suitable for a paint pigment. Also, by preventing the formation of $TiCl_4$ a large saving in chlorine is effected. If $TiCl_4$ is allowed to form, the excessive consumption of chlorine incident thereto renders the process impracticable commercially. In my process the chloridization efficiency is about 100%.

8. In my process, I avoid the difficulty incident to the separation of the chlorides of iron and titanium. Furthermore, since $TiF_4$ is stable in water solutions, no difficulty is encountered in the later stages of purifying the $TiO_2$ by means of $NH_4F$ and/or $HF.NH_4F$.

A specific example of carrying out my process is as follows:

100 parts by weight of ground ilmenite is mixed with 6 parts by weight of ground charcoal. The mixture is placed in a furnace, preferably of the rotary type, and heated at about 900° C. for one hour. Chlorine is then introduced into the furnace while the temperature is maintained at 700 to 800° C. I have been able to obtain good results when the chloridization is conducted through the entire range of temperature from 450 to 900° C. However, I prefer to chloridize at not lower than 350° C. nor higher than 1000° C. When $FeCl_3$ ceases to be evolved, the chloridizing is discontinued and the material allowed to cool.

The cooled residue weighing about 50 parts by weight contains approximately 94% $TiO_2$ and 4% FeO.

This residue is then treated with $HF.NH_4F$ and placed in acidulated water. The complex titanium salt is leached from the residue and the liquid bearing this titanium salt is treated with ammonium sulphide which precipitates any iron which has gone into solution. The iron sulphide is removed by filtration. The filtrate is then treated with $NH_4OH$ which precipitates the titanium as titanium hydroxide. The titanium hydroxide is filtered from the solution and then calcined. This calcined material is a high quality $TiO_2$ and practically free from iron.

In carrying out the reduction of ferric oxide to metallic iron, I may use other carbonaceous reducing agents, such as coal, coke, oil, tar, hydrocarbons, etc. in lieu of the charcoal. Caking of the material should be prevented. I prefer a muffle type rotary kiln, because this effects intimate contact between the carbon and the iron, and if the chloridization be also carried out in this kiln, very satisfactory intimate contact between the iron and the chlorine is also effected. The kiln is vented to the atmosphere during the reduction step. If desired, the residue obtained by the reduction may be transferred from the kiln where reduction occurred to another furnace where the chloridization will be carried out.

The steps of my process heretofore described for the treatment of titaniferous material to recover $TiO_2$ are also applicable to the treatment of zirconiferous material for the recovery of $ZrO_2$.

In the following claims, the expression "substantially all" is employed in defining the degree of reduction of iron compounds to metallic iron and is intended to cover reductions to the extent where the unreduced material will contain no more than 4% of iron in the unreduced, non-metal condition.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In a process of making titanium oxide from oxides of iron and titanium, treating the titaniferous material with a quantity of carbon and at temperature below 1000° C. but sufficiently high to reduce to metal substantially all iron compounds in said material, said quantity of carbon being sufficient to reduce to metal at least 96% of the iron content but insufficient to effect reduction of more than a negligible part of the titanium content of the titaniferous material, then selectively forming ferric chloride from the metallic iron and volatilizing the ferric chloride thus formed by subjecting the reduced material to the action of chloridizing gas at temperature above 450° C. and below 900° C.

2. In a process of making titanium oxide from oxides of iron and titanium, conditioning the titaniferous material for removal of iron therefrom by treating titaniferous material with a quantity of carbon in substantially stoichiometric proportion to the iron of the titaniferous material and at a temperature below 1000° C. but sufficiently high to reduce to metal substantially all iron compounds in said material and then selectively forming ferric chloride from the metallic iron and volatilizing the ferric chloride thus formed by subjecting the reduced material to the action of chloridizing gas at a temperature above 350° C. and below 1000° C.

3. In a process of making titanium oxide from oxides of iron and titanium, treating the titaniferous material with a quantity of carbonaceous reducing agent and at temperature below 1000° C. but sufficiently high to reduce to metal substantially all iron compounds in said material, said quantity of carbonaceous reducing agent being sufficient to reduce to metal at least 96% of the iron content but insufficient to effect reduction of more than a negligible part of the titanium content of the titaniferous material, then selectively forming ferric chloride from the metallic iron and volatilizing the ferric chloride thus formed by subjecting the reduced material to the action of chloridizing gas at a temperature above 350° C. and below 1000° C.

4. In a process of making titanium oxide from oxides of iron and titanium, treating the titaniferous material with a quantity of carbon in substantially stoichiometric proportion to the iron of the titaniferous material and at a temperature below 1000° C. but sufficiently high to reduce to metal substantially all iron compounds in said material, then selectively forming ferric chloride from the metallic iron and volatilizing the ferric chloride thus formed by subjecting the reduced material to the action of chloridizing gas at a temperature above 450° C. and below 900° C.

5. In a process of making titanium oxide from oxides of iron and titanium, treating the titaniferous material with a quantity of carbon in substantially stoichiometric proportion to the iron of the titaniferous material and at a temperature below 1000° C. but sufficiently high to reduce to metal substantially all iron compounds in said material, then selectively forming ferric chloride from the metallic iron and volatilizing the ferric chloride thus formed by subjecting the reduced material to the action of chloridizing gas at a temperature above 350° C. and below 1000° C., converting the titanium oxide in the residue into complex salt containing titanium and fluorine, dissolving the salt, precipitating as a sulphide any iron present in the solution, removing the precipitated iron sulphide, forming titanium hydroxide from the titanium salt in the solution, and then calcining the titanium hydroxide to produce titanium oxide.

6. In a process of making titanium oxide from oxides of iron and titanium, heating the titaniferous material with a carbonaceous reducing agent at temperatures below 1000° C. but sufficiently high to reduce to metallic iron substantially all iron compounds in the titaniferous material, said quantity of carbonaceous reducing agent being sufficient to reduce to metal at least 96% of the iron content but insufficient to effect reduction of more than a negligible part of the titanium content of the titaniferous material, removing any remaining carbonaceous reducing material from the reduced mass, subjecting the resulting mass to the action of a chloridizing gas at temperature above 350° C. and below 900° C.

and for a sufficient length of time to form ferric chloride from the iron present in the mass and to volatilize the ferric chloride thus formed, collecting the evolved ferric chloride, treating the residue with a member of the group composed of ammonium fluoride and ammonium bifluoride at a sufficiently high temperature to convert the titanium oxide therein to a complex salt containing titanium and fluorine which is soluble in water but below the temperature at which the complex salt volatilizes, dissolving the salt from the mass, treating the solution containing the titanium salt with a sulphide to precipitate any iron present in the solution, removing the precipitated iron sulphide, then precipitating titanium hydroxide from the remaining solution, removing the precipitate and then calcining to produce titanium oxide.

7. In a process of making titanium oxide from oxides of iron and titanium, heating the titaniferous material with carbon in substantially stoichiometric proportion to the iron of the titaniferous material and at temperatures below 1000° C. but sufficiently high to reduce to metallic iron substantially all iron compounds in the titaniferous material, removing any remaining carbonaceous reducing material from the reduced mass, subjecting the resulting mass to the action of chlorine gas at temperature above 450° C. and below 900° C. and for a sufficient length of time to form ferric chloride from the iron present in the mass and to volatilize the ferric chloride thus formed, collecting the evolved ferric chloride, treating the residue with a member of the group composed of ammonium fluoride and ammonium bifluoride at a sufficiently high temperature to convert the titanium oxide therein to a complex salt containing titanium and fluorine which is soluble in water but below the temperature at which the complex salt volatilizes, dissolving the salt from the mass, treating the solution containing the titanium salt with a sulphide to precipitate any iron present in the solution, removing the precipitated iron sulphide, then precipitating titanium hydroxide from the remaining solution, removing the precipitate and then calcining to produce titanium oxide.

8. In a process for treating oxides of iron and a member of the group consisting of titanium and zirconium, subjecting the oxides to the action of a sufficient quantity of carbonaceous reducing agent at a temperature below 1000° C. but sufficiently high to reduce to metal substantially all iron compounds in said material, said quantity of carbonaceous reducing agent being sufficient to reduce to metal at least 96 per cent of the iron content but insufficient to effect reduction of more than a negligible part of the oxide of the member of said group consisting of titanium and zirconium, then selectively forming ferric chloride from the metallic iron and volatilizing the ferric chloride thus formed by subjecting the reduced material to the action of chloridizing gas at a temperature above 350° C. and below 1000° C.

9. In a process of making zirconium oxide from oxides of iron and zirconium, treating the zirconiferous material with a quantity of carbonaceous reducing agent and at temperature below 1000° C. but sufficiently high to reduce to metal substantially all iron compounds in said material, said quantity of carbonaceous reducing agent being sufficient to reduce to metal at least 96% of the iron content but insufficient to effect reduction of more than a negligible part of the zirconium content of the zirconiferous material, then selectively forming ferric chloride from the metallic iron and volatilizing the ferric chloride thus formed by subjecting the reduced material to the action of chloridizing gas at a temperature above 350° C. and below 1000° C.

10. In a process of making zirconium oxide from oxides of iron and zirconium, treating the zirconiferous material with a quantity of carbon and at temperature below 1000° C. but sufficiently high to reduce to metal substantially all iron compounds in said material, said quantity of carbon being sufficient to reduce to metal at least 96% of the iron content but insufficient to effect reduction of more than a negligible part of the zirconium content of the zirconiferous material, then selectively forming ferric chloride from the metallic iron and volatilizing the ferric chloride thus formed by subjecting the reduced material to the action of chloridizing gas at temperature above 450° C. and below 900° C.

11. In a process of making zirconium oxide from oxides of iron and zirconium, conditioning the zirconiferous material for removal of iron therefrom by treating zirconiferous material with a quantity of carbon in substantially stoichiometric proportion to the iron of the zirconiferous material and at a temperature below 1000° C. but sufficiently high to reduce to metal substantially all iron compounds in said material and then selectively forming ferric chloride from the metallic iron and volatilizing the ferric chloride thus formed by subjecting the reduced material to the action of chloridizing gas at a temperature above 350° C. and below 1000° C.

KENNETH HUME DONALDSON.